United States Patent
Krause

(10) Patent No.: US 9,403,930 B2
(45) Date of Patent: Aug. 2, 2016

(54) POLYISOCYANATE POLYADDITION PRODUCTS, A PROCESS FOR PREPARATION THEREOF AND USE THEREOF

(75) Inventor: Jens Krause, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 175 days.

(21) Appl. No.: 13/994,378

(22) PCT Filed: Dec. 13, 2011

(86) PCT No.: PCT/EP2011/072577
§ 371 (c)(1),
(2), (4) Date: Jul. 10, 2013

(87) PCT Pub. No.: WO2012/080226
PCT Pub. Date: Jun. 21, 2012

(65) Prior Publication Data
US 2013/0303720 A1    Nov. 14, 2013

(30) Foreign Application Priority Data

Dec. 16, 2010    (EP) ..................................... 10306434

(51) Int. Cl.
*C08G 18/20* (2006.01)
*C08G 18/10* (2006.01)

(52) U.S. Cl.
CPC ............ *C08G 18/2063* (2013.01); *C08G 18/10* (2013.01)

(58) Field of Classification Search
None
See application file for complete search history.

(56) References Cited

U.S. PATENT DOCUMENTS

| | | | |
|---|---|---|---|
| 3,471,445 A * | 10/1969 | Carr | 528/65 |
| 3,714,077 A | 1/1973 | Cobbledick et al. | |
| 4,080,365 A * | 3/1978 | Hirai et al. | 560/25 |
| 4,424,353 A * | 1/1984 | Meyer et al. | 544/253 |
| 4,431,753 A | 2/1984 | Casati et al. | |
| 4,584,362 A | 4/1986 | Leckart et al. | |
| 4,673,696 A | 6/1987 | Tsai | |
| 5,011,902 A | 4/1991 | Foucht | |
| 5,177,170 A * | 1/1993 | Sarpeshkar et al. | 528/76 |
| 5,218,040 A * | 6/1993 | Gras et al. | 524/589 |
| 5,902,835 A | 5/1999 | Meier et al. | |
| 6,590,057 B1 | 7/2003 | Brecht et al. | |
| 2007/0010644 A1 | 1/2007 | Erickson et al. | |
| 2007/0212553 A1 | 9/2007 | Stearns | |
| 2008/0090973 A1 | 4/2008 | Nefzger et al. | |
| 2009/0044907 A1 | 2/2009 | Tribelhorn et al. | |
| 2010/0130629 A1 | 5/2010 | Kometani et al. | |
| 2011/0027489 A1* | 2/2011 | Groenewolt et al. | 427/387 |
| 2011/0054140 A1* | 3/2011 | Krause et al. | 528/53 |

FOREIGN PATENT DOCUMENTS

| | | |
|---|---|---|
| CN | 101168592 A | 4/2008 |
| DE | 3718935 A1 | 1/1988 |
| DE | 102004011348 A1 | 9/2005 |
| DE | 102007009128 A1 | 9/2007 |
| DE | 102008021980 A1 | 11/2009 |
| DE | 102008026341 A1 | 11/2009 |
| EP | 0989146 A1 | 3/2000 |
| EP | 1489119 A1 | 12/2004 |
| WO | WO-2008018601 A1 | 2/2008 |
| WO | WO-2008155569 A1 | 12/2008 |
| WO | WO 2009/132784 A1 * | 3/2009 |
| WO | WO-2009050115 A1 | 4/2009 |
| WO | WO 2009/077181 A1 * | 6/2009 |

OTHER PUBLICATIONS

BDO tech sheet, 2011.*
International Search Report for PCT/EP2011/072577 mailed Feb. 28, 2012.

* cited by examiner

*Primary Examiner* — Jeffrey Washville
(74) *Attorney, Agent, or Firm* — Drinker Biddle & Reath LLP

(57) ABSTRACT

The invention relates to polyisocyanate polyaddition products, to a process for preparation thereof and to the use thereof.

8 Claims, No Drawings

POLYISOCYANATE POLYADDITION PRODUCTS, A PROCESS FOR PREPARATION THEREOF AND USE THEREOF

RELATED APPLICATIONS

This application is a national stage application (under 35 U.S.C. §371) of PCT/EP2011/072577, filed Dec. 13, 2011, which claims benefit of European Patent Application No. 10306434.1, filed Dec. 16, 2010.

The invention relates to polyisocyanate polyaddition products, to a process for preparation thereof and to the use thereof.

Polyurethanes have been known for a long time and are used in many sectors. Frequently, the actual polyurethane reaction has to be performed using catalysts, since the reaction otherwise proceeds too slowly and may lead to polyurethane products with poor mechanical properties. In most cases, the reaction between the hydroxyl component (NCO-reactive group, OH group) and the NCO component has to be catalyzed. The commonly used catalysts are divided into metallic and nonmetallic catalysts. Typical commonly used catalysts are, for example, amine catalysts, for example 1,4-diazabicyclo[2.2.2]octane (DABCO) or triethanolamine, and amidine catalysts, for instance 1,8-diazabicyclo[5.4.0]undec-7-ene (DBU). Metallic catalysts are usually Lewis acid compounds, for instance dibutyltin dilaurate, lead octoate, tin octoate, titanium and zirconium complexes, but also cadmium compounds, bismuth compounds (for example bismuth neodecanoate) and iron compounds. One requirement on the catalyst is that it catalyzes only one of the various polyurethane reactions in a very well-defined manner, for instance only the reaction between OH and NCO groups. Side reactions, for example di- or trimerizations of the isocyanate, allophanatizations, biuretizations, water reactions or urea formations should not be catalyzed at the same time. The requirement is always to the effect that an optimal catalyst catalyzes exactly the reaction desired; for example, only the water reaction, so as to give rise to a defined foam profile or, as in the case of use of the potassium acetates, preferably the polyisocyanurate reaction. However, there are barely any catalysts to date which catalyze only one defined reaction. But this is exceptionally desirable given the various possible reactions in polyurethane preparation. Catalysts of particular interest are not only those which catalyze only one reaction in a defined manner, but also catalysts which additionally become selectively active and catalyze reactions only under particular conditions. In such cases, reference is made to switchable catalysts. These switchable catalysts are in turn divided into thermally, photochemically, chemically (for example via dissociation) and optically switchable catalysts. In general, reference is also made in this context to latent catalysts and, in the thermal case, to thermolatent catalysts. These catalysts are inactive until the reaction mixture reaches a particular temperature. Above this temperature, they are then active, preferably instantaneously active. These latent catalysts enable long pot lives and fast demolding times.

The latent catalysts known to date and used with preference are mercury compounds. The most prominent representative here is phenylmercuric neodecanoate (Thorcat® 535 and Cocure® 44). This catalyst reveals a latent reaction profile, the catalyst being virtually inactive at first and becoming abruptly active at a particular temperature (usually around 70° C.) only after gradual heating of the mixture, usually due to the exothermicity of the uncatalyzed reaction of NCO with OH groups. When this catalyst is used, very long open times coupled with very short curing times can be achieved. This is advantageous particularly when a very large amount of material has to be discharged (for example a large mold has to be filled) and, on completion of discharge, the reaction is to be ended rapidly and thus economically.

A particular advantage of the latent catalysts is considered to be that, in finished polyurethane material, they accelerate the cleavage of urethane groups only slightly compared to conventional catalysts, for example at room temperature, due to the decrease in their catalytic action with falling temperature. They thus contribute to favorable long-term use properties of the polyurethanes.

Furthermore, in the case of use of catalysts, it should generally be ensured that the physical properties of the products are adversely affected to a minimum degree. This is also the reason why controlled catalysis of a particular reaction is so important. Specifically in the case of production of elastomers, especially of cast elastomers, the use of mercury catalysts is very widespread, since they are widely usable, need not be combined with additional catalysts and catalyze the reaction between OH and NCO groups in a very controlled manner. The only disadvantage—but a very important one—is the high toxicity of the mercury compounds, such that great efforts are being made to find alternatives to the mercury catalysts. Furthermore, these compounds are unwelcome in some industries (automotive and electrical industries).

Systems which are at least less toxic than mercury catalysts, for example based on tin, zinc, bismuth, titanium or zirconium, but also amidine and amine catalysts, are known on the market, but to date do not have the robustness and simplicity of the mercury compounds and are additionally not latent, or not latent enough.

WO 2008/018601 describes the use of catalysts based on blends of amines, cyclic nitrogen compounds, carboxylates and/or quaternary ammonium salts. Such blends, however, have the disadvantages known to those skilled in the art. While amines and cyclic nitrogen compounds have direct activating action and thus entail insufficient latency for particular applications, carboxylates and quaternary ammonium salts also catalyze, for example, the polyisocyanurate reaction, which must be absolutely prevented in particular applications, for example high-performance elastomers.

The effect of particular combinations of catalysts is that the gel reaction proceeds very substantially separately from the curing reaction, since many of these catalysts act only selectively. For example, bismuth(III) neodecanoate is combined with zinc neodecanoate. Often, 1,8-diazabicyclo[5.4.0]undec-7-ene is additionally added. Even though this combination is one of the most well-known, it is unfortunately not as widely and universally usable as, for example, Thorcat® 535 (from Thor Especialidades S.A.) and is additionally susceptible in the event of variations in formulation. The use of these catalysts is described in DE-A 10 2004 011 348. Further combinations of catalysts are disclosed in U.S. Pat. Nos. 3,714,077, 4,584,362, 5,011,902, 5,902,835 and 6,590,057.

WO 2005/058996 describes the combination of titanium catalysts and zirconium catalysts with bismuth catalysts. A crucial disadvantage of the catalyst combinations described is, however, that they are not as widely and universally usable as the mercury catalysts and are susceptible in the event of variations in formulation.

The titanium catalysts described in WO 2008/155569 are also afflicted with some disadvantages compared to the mercury catalysts. For acceptable results, it is necessary to add an amine-based cocatalyst. This is a trimerization catalyst, which in particular applications (e.g. cast elastomers) has adverse effects on the physical properties of the polyurethanes. A variation in the mixing ratio of the catalyst components can achieve either very good latency or very good material properties, but not both at the same time. The catalyst combinations described consequently have to be matched to the particular requirements with regard to the mixing ratio thereof, which means that it is not possible with one catalyst combination to cover all applications, and this constitutes a crucial disadvantage.

The DABCO DC-2 product from Air Products Chemicals Europe B.V., which is available on the market, is a catalyst mixture of 1,4-diazabicyclo[2.2.2]octane (DABCO) and dibutyltin diacetate. The disadvantage of this mixture is that the amine has direct activating action. Alternative systems are, for example, POLYCAT® SA-1/10 (from Air Products Chemicals Europe B.V.). This comprises phenol-blocked DBU. Even though this system is thermolatent, such systems are not used due to their poor catalytic action in the course of curing; the elastomers produced in the presence of these systems remain tacky at the end of the reaction; this is also referred to as "starvation" of the reaction. A disadvantage here is probably the excessive blocking by the phenol, such that the switching temperature is much too high (according to the manufacturer this is 80° C.).

WO 2009/050115 describes photolatent catalysts, but these have several important disadvantages. Solid moldings are generally produced in nontransparent metal molds, as a result of which activation of the photolatent catalysts by an external radiation source is virtually impossible. Even in the case of a technical solution to this problem, a further, inherent disadvantage arises from the limited penetration depth of the electromagnetic radiation into the reaction mixture.

DE-A 10 2008 026 341 describes thermolatent catalysts based on N-heterocyclic carbenes, but these have some significant disadvantages. The preparation of the compounds is very complex and hence costly, which means that there is little economic interest in the use of the catalysts in most applications. Furthermore, the compounds in particular polyurethane systems also catalyze the polyisocyanurate reaction, which must be absolutely prevented in particular applications, for example high-performance elastomers.

DE-A 10 2008 021 980 describes thermolatent tin catalysts, but these have a significant disadvantage. In polyurethane reaction mixtures having less than a certain content of reactive NCO groups, the exothermicity of the uncatalyzed reaction of NCO groups with OH groups is insufficient for the full activation of the thermolatent catalysts. This is especially true of thin-wall moldings, for which the temperatures attained in the course of curing thereof can only be relatively low due to the high surface to volume ratio.

It is likewise known that the mercury-catalyzed thermolatent reaction proceeds about the so-called switching temperatures. The switching temperature of a catalyst is considered by the catalyst manufacturers to be one of the important product properties (TEDA & TOYOCAT TECHNICAL DATA No. EE-003 (Issue Date Sep. 2, 2004)). For example, Tosoh Corporation determines this switching temperature with the aid of differential thermal analysis (DSC), by heating a reaction mixture comprising the catalyst and based on polyether systems at a heating rate of 5° C./min within the temperature range from 30° C. to 250° C. The temperature at which the maximum exothermicity occurs is generally reported as the switching temperature (deblocking temperature). The onset temperature is the temperature at which the exothermic reaction sets in (commencement of exothermicity). Mercury has the great advantage here that the switching temperature of mercury extends over a very wide range commencing at 37.4° C. and ending at 93.9° C. (likewise Tosoh figures), such that the reaction does not "starve" at the end, but does not start up too early either. Some commercially available amines (for instance DABCO, as an unblocked amine) commence at <37.4° C., which leads to premature crosslinking without sufficient crosslinking at the end. Thus, there is incomplete curing.

Alternatively, other commercially available blocked amidines, for instance Polycat SA 1/10, commence much too late at 80° C., such that there are unselective reactions at the start of the reaction, since they are uncatalyzed. The processing time is much too long, and there is gelation of the reaction before complete curing takes place.

A relatively new solution (DE1020100065.0; unpublished German application) is the combination of at least two switchable blocked amines or amidines, the so-called onset temperature of one amine and/or amidine ($T_A$) which switches at low switching temperature being between 30° and 60° C., and the so-called switching temperature of the other amine and/or amidine ($T_{max}$) which switches at higher switching temperature being between 80° C. and 150° C., and the difference between $T_A$ and $T_{max}$ being at least 20° C. and at most 100° C. However, a disadvantage here is that different catalysts react at different junctures. This is a disadvantage particularly in the case of complex solid elastomer moldings, as frequently present in the case of solid cast elastomers. Thin layers in contact with the hot mold cure immediately, in some cases instantaneously, while other parts not in contact with the hot mold need much longer to cure. The result is thus formation of different zones, streaks and hence different properties in the finished elastomer, since the catalysts become deblocked at different junctures. At places where there is no contact with the hot mold, there is no curing, since the higher-switching catalyst does not reach its deblocking temperature.

EP 0 989 146 describes the use of a catalyst composed of an organic dicarboxylic acid (HOOC—$(CH_2)_n$—COOH) and a tertiary amine. Such catalysts exhibit adequate latency in foams, but the switching thereof in cast elastomers is too inhomogeneous, and so these catalysts are commercially unusable.

It was therefore an object of the present invention to provide systems and catalysts with which it is possible to prepare polyisocyanate polyaddition products with good mechanical properties, and which at first exhibit a significantly retarded reaction and, after this initial phase, an accelerated reaction to give the end product. The system and the catalyst should additionally be free of toxic heavy metals, such as cadmium, mercury and lead. In addition, the mechanical properties of the polyisocyanate polyaddition products should at least be at the level of those obtained with the mercury catalysts. The system should also be selected such that no water reactions are catalyzed and that the catalyst can preferably be used dissolved in the polyol. In addition, it should be storage-stable in the polyol.

This object was surprisingly achievable by virtue of the inventive polyisocyanate polyaddition products.

The invention provides polyisocyanate polyaddition products with good mechanical properties, obtainable from
  a) polyisocyanates and
  b) NCO-reactive compounds from the group of b1) long-chain polyester polyols having an OH number of 27 to 112 mg KOH/g and a functionality of 1.9 to 2.3 and b2) short-chain hydroxyl compounds having an OH number of 300 to 1810 mg KOH/g and a functionality of 1.9 to 2.3, in the presence of
c) a latent catalyst
d) optionally further catalysts other than c) and/or activators, with addition of
e) optionally fillers and/or fiber materials
f) optionally assistants and/or additives,
g) optionally blowing agents,
h) at least one water scavenger, characterized in that the latent catalyst (c) used comprises monocarboxylic acid-blocked amidines in an amount of 20 to 400 ppm, based on component b1), the molar ratio of amidine to carboxylic acid being between 1:3 and 1:0.5.

The ratio of NCO-reactive groups to NCO groups is preferably in the range from 0.9:1 to 1.25:1, more preferably in the range from 0.92:1 to 1.0:1 and most preferably in the range from 0.94:1 to 0.98:1.

The polyisocyanate polyaddition products have rapid and good demoldability and have good mechanical properties. Preferably, unfoamed solid cast elastomers are produced. The casting time (of a 400 g reaction mixture in a plastic cup) of the inventive polyisocyanate polyaddition products is in the range from 2 to 10 minutes. The hardness of the polyisocyanate polyaddition products is preferably in the range from 50 to 96 Shore A, more preferably in the range from 60 to 96 Shore A and most preferably in the range from 60 to 85 Shore A.

The catalysts (d) used are preferably metal catalysts. Useful typical metal catalysts include, for example, salts and organo compounds of the elements zirconium, titanium, tin, copper, lead, bismuth, zinc.

The latent catalyst is used in an amount of 20 to 400 ppm (parts per million by weight), based on (b1), preferably in an amount of 50 to 350 ppm, more preferably of 80 to 300 ppm, based on component b1).

The starting compounds used for the latent catalysts (c) used are amidines, for example 1,8-diazabicyclo[5.4.0]undec-7-ene (DBU) and diazabicyclo[4.3.0]non-5-ene (DBN), and acids of the structure R—COOH (where R represents saturated and unsaturated alkyl and cycloalkyl radicals and aryl radicals, the hydrogen atoms of which may be replaced, for example, by halogen atoms and OH groups), for example 2-ethylhexanoic acid, formic acid, acetic acid, methacrylic acid, trifluoroacetic acid, crotonic acid, isocrotonic acid, isophthalic acid, methacrylic acid, benzoic acid, cyanoacetic acid, 5-hydroxyisophthalic acid, methylsalicylic acid. Particular preference is given to using monoalkenecarboxylic acids. Reaction products formed from one mole of DBU and one mole of an alkenemonocarboxylic acid, for example crotonic acid, isocrotonic acid or methacrylic acid, are particularly preferred. A particularly preferred catalyst is the reaction product formed from DBU and isocrotonic acid.

Preference is given to using an approximately equimolar ratio of acid and amidine, such that the pH of the catalyst is not well below 7, since this otherwise leads to corrosion when used in plants, and is not well above 7, such that portions of the amidine are in unblocked form and there is thus no latency.

The so-called switching range of the latent catalyst used is at an onset temperature of 30° C. to 150° C., the deblocking temperature being between 60 and 90° C. The deblocking temperature is preferably between 70 and 85° C. The final temperature is preferably between 120° C. and 140° C.

The water scavengers (h) used may be water scavengers or desiccants, for example silica gel or zeolites. Alternative, less preferred desiccants are, for example, inorganic salts, for example sodium sulfate, magnesium sulfate, calcium chloride and sodium chloride, phosphorus oxides and alkoxysilanes. The water scavengers (h) used are most preferably zeolites, which are preferably added to the component comprising the catalyst (c). Particular preference is given to adding the latent catalyst (c) and the water scavenger (h) to the NCO-reactive compounds (b). The water scavenger (h) is preferably present in an amount of 0.1 to 5% by weight based on component (b1).

The invention further provides a process for preparing the inventive polyisocyanate polyaddition products, by reacting
a) polyisocyanates with
b) NCO-reactive compounds from the group of b1) long-chain polyester polyols having an OH number of 27 to 112 mg KOH/g and a functionality of 1.9 to 2.3 and b2) short-chain hydroxyl compounds having an OH number of 300 to 1810 mg KOH/g and a functionality of 1.9 to 2.3,
in the presence of
c) a latent catalyst
d) optionally further catalysts other than c) and/or activators, with addition of
e) optionally fillers and/or fiber materials
f) optionally assistants and/or additives,
g) optionally blowing agents,
h) at least one water scavenger, characterized in that the latent catalyst (c) used comprises monocarboxylic acid-blocked amidines in an amount of 20 to 400 ppm, based on component b1), the molar ratio of amidine to carboxylic acid being between 1:3 and 1:0.5.

In a preferred process, the blocked amidine catalyst is added via the NCO-reactive compounds b) and any catalyst (d) present is added separately, for example via the mixing head.

The invention further provides for the use of the latent catalysts for production of polyisocyanate polyaddition products, specifically polyurethane elastomers, and also coatings, adhesives and sealants, resins and binders, preferably cast polyurethane elastomers, more preferably solid cast polyurethane elastomers.

The solid polyurethane cast elastomers are preferably used for the production of screens, pipeline pigs, rolls, wheels, rollers, strippers, plates, cyclones, conveyor belts, coating bars, couplings, seals, buoys and pumps. They preferably have hardnesses in the range from 50 to 96 Shore A, more preferably in the range from 60 to 96 Shore A and most preferably in the range from 60 to 85 Shore A.

The polyisocyanates (a) suitable for the preparation of polyisocyanate polyaddition compounds are the organic aliphatic, cycloaliphatic, aromatic or heterocyclic polyisocyanates having at least two isocyanate groups per molecule, which are known per se to those skilled in the art, and mixtures thereof. Examples of suitable aliphatic and cycloaliphatic polyisocyanates are di- or triisocyanates, for example butane diisocyanate, pentane diisocyanate, hexane diisocyanate (hexamethylene diisocyanate, HDI), 4-isocyanatomethyl-1,8-octane diisocyanate (triisocyanatononane, TIN) and cyclic systems, for example 4,4'-methylenebis(cyclohexyl isocyanate), 3,5,5-trimethyl-1-isocyanato-3-isocyanatomethylcyclohexane (isophorone diisocyanate, IPDI), and ω,ω'-diisocyanato-1,3-dimethylcyclohexane ($H_6$XDI). The aromatic polyisocyanates used may, for example, be naphthalene 1,5-diisocyanate, diisocyanatodiphenylmethane (2,2'-, 2,4'- and 4,4'-MDI or mixtures thereof), diisocyanatomethylbenzene (tolylene 2,4- and 2,6-diisocyanate, TDI) and technical-grade mixtures of the two isomers, and 1,3-bis(isocyanatomethyl)benzene (XDI). In addition, it is possible to use TODI (3,3'-dimethyl-4,4'-biphenyl diisocyanate), PPDI (1,4-paraphenylene diisocyanate) and CHDI (cyclohexyl diisocyanate).

Moreover, it is also possible to use the conversion products, known per se, of the aforementioned organic aliphatic, cycloaliphatic, aromatic or heterocyclic polyisocyanates with carbodiimide, uretonimine, uretdione, allophanate, biuret and/or isocyanurate structure, and prepolymers which are obtained by reaction of the polyisocyanate with compounds having groups reactive toward isocyanate groups.

The polyisocyanate component (a) may also be present in a suitable solvent. Suitable solvents are those which have sufficient solubility for the polyisocyanate component and are free of groups reactive toward isocyanates. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methylpyrrolidone, M-ethylpyrrolidone, methylal, ethylal, butylal, 1,3-dioxolane, glycerol formal, benzene, toluene, n-hexane, cyclohexane, Solvent naphtha, 2-methoxypropyl acetate (MPA).

The isocyanate component may additionally comprise customary assistants and additives, for example rheology improvers (for example ethylene carbonate, propylene carbonate, dibasic esters, citric esters), stabilizers (for example Brønsted and Lewis acids, for instance hydrochloric acid, phosphoric acid, benzoyl chloride, organo mineral acids such as dibutyl phosphate, and also adipic acid, malic acid, succinic acid, pyruvic acid or citric acid), UV stabilizers (for example 2,6-dibutyl-4-methylphenol), hydrolysis stabilizers (for example sterically hindered carbodiimides), emulsifiers, dyes which may be incorporable into the polyurethane to be formed at a later stage (which thus possess Zerevitinov-active hydrogen atoms) and/or color pigments.

The polyisocyanates (a) are preferably solvent-free NCO prepolymers formed from diphenylmethane diisocyanate (MDI) and carbodiimidized/uretoniminized diphenylmethane diisocyanate and/or allophanatized MDI. The content of the carbodiimidized/uretoniminized diphenylmethane diisocyanate and/or allophanatized MDI in the prepolymer is especially preferably in the range from 0.02 to 6.5% by weight, very especially preferably in the range from 0.4 to 5% by weight and even more preferably in the range from 0.7 to 2.5% by weight. The 4,4' isomer of MDI is preferably present in proportions of 80 to 100% by weight, more preferably of 95 to 100% by weight. Preference is given to prepolymers based on polyester polyols, more preferably based on polyadipate polyols, most preferably based on poly(butylene-co-ethylene adipate)polyols. The NCO contents are preferably in the range from 12 to 22% by weight, more preferably in the range from 14 to 20% by weight and most preferably in the range from 15 to 17% by weight.

The NCO-reactive compounds (b) used may be all compounds which are known to those skilled in the art and have a mean OH functionality of at least 1.5. These may be, for example, low molecular weight polyols b2), for example diols (e.g. 1,2-ethanediol, 1,3- or 1,2-propanediol, 1,4-butanediol), triols (e.g. glycerol, trimethylolpropane) and tetraols (e.g. pentaerythritol), but also higher molecular weight polyester polyols b1).

Polyester polyols can be prepared in a known manner by polycondensation of low molecular weight polycarboxylic acid derivatives, for example succinic acid, glutaric acid, adipic acid, suberic acid, azelaic acid, sebacic acid, dodecanedioic acid, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid, trimer fatty acid, phthalic acid, phthalic anhydride, isophthalic acid, terephthalic acid, citric acid or trimellitic acid, with low molecular weight polyols, for example ethylene glycol, diethylene glycol, neopentyl glycol, hexanediol, butanediol, propylene glycol, glycerol, trimethylolpropane, 1,4-hydroxymethylcyclohexane, 2-methyl-1,3-propanediol, butane-1,2,4-triol, triethylene glycol, tetraethylene glycol, polyethylene glycol, dipropylene glycol, polypropylene glycol, dibutylene glycol and polybutylene glycol, or by ring-opening polymerization of cyclic carboxylic esters such as ε-caprolactone. In addition, it is also possible to polycondense hydroxycarboxylic acid derivatives, for example lactic acid, cinnamic acid or ω-hydroxycaproic acid to give polyester polyols. However, it is also possible to use polyester polyols of oleochemical origin. Such polyester polyols can be prepared, for example, by full ring-opening of epoxidized triglycerides of an at least partly olefinically unsaturated fatty acid-containing fat mixture with one or more alcohols having 1 to 12 carbon atoms and subsequent partial transesterification of the triglyceride derivatives to alkyl ester polyols having 1 to 12 carbon atoms in the alkyl radical.

The preparation of suitable polyacrylate polyols is known per se to those skilled in the art. They are obtained by free-radical polymerization of olefinically unsaturated monomers having hydroxyl groups or by free-radical copolymerization of olefinically unsaturated monomers having hydroxyl groups with optionally different olefinically unsaturated monomers, for example ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable olefinically unsaturated monomers having hydroxyl groups are especially 2-hydroxyethyl acrylate, 2-hydroxyethyl methacrylate, the hydroxylpropyl acrylate isomer mixture obtainable by addition of propylene oxide onto acrylic acid, and the hydroxypropyl methacrylate isomer mixture obtainable by addition of propylene oxide onto methacrylic acid. Suitable free-radical initiators are those from the group of the azo compounds, for example azoisobutyronitrile (AIBN), or from the group of the peroxides, for example di-tert-butyl peroxide.

The NCO-reactive compounds b1) (long-chain polyols) are preferably polyester polyols, more preferably polyester polyols having OH numbers of 27 to 112 mg KOH/g, very especially preferably of 40 to 80 mg KOH/g, even more preferably of 50 to 70 mg KOH/g. The functionalities are preferably in the range from 1.9 to 2.3, more preferably in the range from 1.95 to 2.2, very especially preferably in the range from 2.0 to 2.15 and especially preferably in the range from 2.02 to 2.09. Preference is given to using solvent-free polyols.

The short-chain, NCO-reactive hydroxyl compounds b2) are preferably short-chain diols, for example 1,2-ethanediol, 1,2-propanediol, 1,3-propanediol, 1,3-butanediol, 1,4-butanediol, 2,3-butanediol, 1,5-pentanediol, 1,6-hexanediol, HQEE (hydroquinone di(β-hydroxyethyl)ether), HER (resorcinol di(β-hydroxyethyl)ether). Less preferred are triols (e.g. glycerol, trimethyloipropane) and/or tetraols (e.g. pentaerythritol). The short-chain hydroxyl compounds b2) used are more preferably the short-chain diols, for example 1,2-ethanediol, 1,2-propanediol, 1,3-propanediol, 1,4-butanediol, 1,5-pentanediol, 1,6-hexanediol; very particular preference is given to 1,4-butanediol.

Preferred assistants and additives (f) are rheology improvers, stabilizers, UV stabilizers, hydrolysis stabilizers, emulsifiers, incorporatable dyes (which thus have Zerevitinov-active hydrogen atoms) and/or color pigments, fillers, for example chalk, carbon black, flame retardants, color pastes, microbicides, flow improvers, thixotropic agents, surface modifiers, silicone oils, degassing aids and retardants which can be used in the preparation of the polyisocyanate polyaddition products. An overview can be found in G. Oertel, Polyurethane Handbook, $2n^d$ edition, Carl Hanser Verlag, Munich, 1994, ch. 3.4.

The invention is to be illustrated in detail by the examples which follow.

EXAMPLES

Raw Materials Used:
1.) MDQ 23165: MDI prepolymer from Baulé S.A.S., formed from poly(ethylene-co-butylene) adipate of hydroxyl number 56 mg KOH/g, Desmodur® 44M and Desmodur CD-S with a proportion of carbodiimidized/uretoniminized MDI of approx. 2% by weight and an NCO content of 16.4% by weight.
2.) Desmodur® 44M: diphenylmethane 4,4'-diisocyanate from Bayer MaterialScience AG with an NCO content of approx. 33.5% by weight.
3.) Desmodur® CD-S: polyisocyanate (carbodiimidized/uretoniminized diphenylmethane diisocyanate based on diphenylmethane 4,4'-diisocyanate) from Bayer MaterialScience AG with an NCO content of approx. 29.5% by weight and a proportion of carbodiimidized/uretoniminized MDI of approx. 23.5% by weight.
4.) Baytec® D22/70: polyadipate polyol from Bayer MaterialScience with a hydroxyl number of 59 mg KOH/g and a functionality of 2.06.
5.) 1,4-butanediol: from BASF
6.) Polycat® SA-1/10: switchable amidine from Air Products which, according to the manufacturer, switches/is latent at 80° C. (measured in a polyether system); it consists of DBU and phenol (1:1 molar)
7.) Dabco KTM 60: switchable amine from Air Products which, according to the manufacturer, switches/is latent at 60° C. (measured in a polyether system); it consists of DABCO and is blocked with phenol
8.) TIB KAT 214 (dioctyltin dimercaptide) from TIB Chemicals AG, Mannheim.
9.) Thorcat® 535 (80% phenyl-Hg neodecanoate, 20% neodecanoic acid); from Thor Especialidades S.A.)
10.) UOP L paste from UOP (zeolite; water scavenger)
11.) Catalyst 1: reaction product of DBU with isocrotonic acid (Z-2-butenoic acid) in a molar ratio of 1:1 in 50% by weight of diethylene glycol. The molar mass of the equimolar reaction product formed from DBU (molar mass 152.24 g/mol) and isocrotonic acid (molar mass 86.09 g/mol) is 238.32 g/mol; it consists to an extent of 63.88% by weight of DBU; catalyst 1 contains 31.94% by weight of DBU, since it is a 50% solution in diethylene glycol. A typical commercial product is Toyocat DB40 from Tosoh Corporation.

Instruments and Analytical Methods Used:
Hydroxyl number: based on standard DIN 53240
% by weight of NCO: based on standard DIN 53185

The casting time was determined by pouring the product into a 400 g cup after crosslinking. Attempts were made to draw a thread with a rod. As soon as the thread no longer breaks off, the casting time has ended (also called cup thread-drawing time).

DSC Analysis:
The switching temperatures were determined with the aid of differential thermal analysis (DSC), by heating a reaction mixture comprising the catalyst at a heating rate of 5° C./min within the temperature range from 35° C. to 180° C. The temperature at which the maximum exothermicity occurred was reported as the switching temperature (deblocking temperature). The onset temperature was the temperature at which the exothermic reaction set in (commencement of exothermicity). The final temperature was likewise measured. The final temperature was the temperature at which the exothermicity (in W/g—watts per g of substance) was at the level of the onset temperature. In addition, particularly in the case of the blocked amidines, there was a further temperature defined as the unblocking temperature. Here, a tangent was applied to the DSC curve. This temperature is the point of intersection of the tangent. In mathematical terms, there is also a turning point here. This point was between deblocking temperature and final temperature.

100 parts by weight of MDQ 23165 (room temperature) were mixed with 180 parts by weight of Baytec® D22/70 (preheated to 60° C.), 9.1 parts by weight of 1,4-butanediol (at room temperature) and the respective catalyst, introduced into a DSC capsule at room temperature and analyzed with respect to the above heating rate. The heating rate was measured in watts/gram of reaction mixture (W/g), as was the temperature.

Production of a Cast Elastomer
100 parts by weight of MDQ 23165 (preheated to 45° C.) were stirred with the appropriate amount of Baytec® D22/70 (preheated to 70° C.) and the catalyst. The appropriate amount of 1,4-butanediol (preheated to 45° C.) was mixed in. The reaction mixture was poured into a preheated mold and demolded after a certain time. This was followed by heat treatment in a heating cabinet at 80° C. for 16 hours. The properties were determined after storage at room temperature for 3 weeks. The amounts, formulations, process parameters and properties of the products can be found in the tables below.

TABLE 1

Formulations and processing

| | | | Examples | | | | | | |
|---|---|---|---|---|---|---|---|---|---|
| | | | 1* | 2* | 3* | 4 | 5 | 6 | 7 |
| Component a) | MDQ 23165 | [parts by wt.] | 100 | 100 | 100 | 100 | 100 | 100 | 100 |
| Component b1) | Baytec ® D22/70 | [parts by wt.] | 180 | 80 | 40 | 180 | 80 | 40 | 180 |
| Component b2) | butane-1,4-diol | [parts by wt.] | 9.1 | 13.6 | 15.4 | 9.1 | 13.6 | 15.4 | 9.1 |
| Component h) | UOP ® L paste | [% by wt., based on component b1)] | 2 | 2 | 2 | | | | 2 |

TABLE 1-continued

Formulations and processing

| | | | Examples | | | | | | |
|---|---|---|---|---|---|---|---|---|---|
| | | | 1* | 2* | 3* | 4 | 5 | 6 | 7 |
| Catalysts | catalyst 1 | [ppm, based on component b1)] | 200 | 200 | 200 | | | | 1000 |
| | TIB KAT 214 | [ppm, based on component b1)] | | | | 7 | | | |
| | Thorcat 535 | [ppm, based on component b1)] | | | | | 1500 | 1500 | 1500 |
| Mold temperature | | [° C.] | 80 | 80 | 100 | 100 | 100 | 100 | 80 |
| Casting time | | [min] | 5.30 | 6.0 | 4 | 6.0 | 6.0 | 4 | 1 |
| Demolding time | | [min] | 25 | 25 | 40 | 45 | 40 | 40 | 20 |
| Initial exothermicity | from DSC | [° C.] and [W/g] | 36.1 and −0.092 | | | | | | |
| Deblocking temperature | from DSC | [° C.] and [W/g] | 75.8 and −0.034 | | | | | | |
| Final blocking temperature | from DSC | [° C.] and [W/g] | 120.4 and −0.066 | | | | | | |
| Final temperature | from DSC | [° C.] and [W/g] | 127.1 and −0.092 | | | | | | |
| Hardness (at 20° C.) | DIN 53505 | [Shore A] | 60 | 85 | 95 | 60 | 85 | 95 | 60 |
| Hardness (at 80° C.) | DIN 53505 | [Shore A] | 55 | 80 | 93 | 54 | 81 | 92 | 50 |
| 10% modulus | DIN 53504 | [MPa] | 0.5 | 2.1 | 6.7 | 0.7 | 2.4 | 6.2 | 0.5 |
| 100% modulus | DIN 53504 | [MPa] | 2.1 | 6.3 | 12 | 2.0 | 7.3 | 13.3 | 2.0 |
| 200% modulus | DIN 53504 | [MPa] | 2.9 | 9.6 | 14.0 | 2.6 | 10.3 | 16.3 | 2.6 |
| 300% modulus | DIN 53504 | [MPa] | 4.0 | 12.5 | 16.6 | 3.7 | 13.6 | 19.7 | 3.4 |
| Tensile stress at break | DIN 53504 | [MPa] | 42 | 45 | 34 | 40 | 49 | 41 | 29 |
| Elongation at break | DIN 53504 | [%] | 650 | 615 | 640 | 600 | 650 | 550 | 700 |
| Tear propagation resistance without notch | DIN 53515 | [kN/m] | 51 | 100 | 144 | 45 | 109 | 137 | 51 |
| Tear propagation resistance with notch | DIN 53515 | [kN/m] | 26 | 47 | 94 | 26 | 51 | 69 | 28 |
| Resilience | DIN 53512 | [%] | 50 | 42 | 37 | 47 | 45 | 40 | 51 |
| Abrasion loss | DIN 53516 | [mm$^3$] | 35 | 40 | 50 | 35 | 45 | 45 | 40 |
| Compression set 24 h/70° C. | DIN 53517 | [%] | 31 | 22 | 26 | 32 | 21 | 25 | 54 |
| Specific density | | [g/mm$^3$] | 1.22 | 1.24 | 1.25 | 1.21 | 1.21 | 1.21 | 1.24 |

TABLE 2

Formulations and processing

| | | | Comparative examples | | | | | | |
|---|---|---|---|---|---|---|---|---|---|
| | | | 8 | 9 | 10 | 11 | 12 | 13 | 14 |
| Component a) | MDQ 23165 | [parts by wt.] | 100 | 100 | 100 | 100 | 100 | 100 | 100 |
| Component b1) | Baytec ® D22/70 | [parts by wt.] | 180 | 180 | 180 | 180 | 180 | 180 | 180 |
| Component b2) | butane-1,4-diol | [parts by wt.] | 9.1 | 9.1 | 9.1 | 9.1 | 9.1 | 9.1 | 9.1 |
| Catalysts | TIB KAT 214 | [ppm, based on b1)] | | | | | | | |
| | Polycat ® SA1/10 | [ppm, based on b1)] | | | | 2000 | 400 | | |

TABLE 2-continued

Formulations and processing

| | | | Comparative examples | | | | | | |
|---|---|---|---|---|---|---|---|---|---|
| | | | 8 | 9 | 10 | 11 | 12 | 13 | 14 |
| | catalyst 1 | [ppm, based on b1)] | 25 | 200 | 700 | | | | |
| | Dabco KTM60 | [ppm, based on b1)] | | | | | | 4000 | 400 |
| Component h) | UOP ® L paste | [% by wt., based on b1)] | 2 | | | 2 | 2 | 2 | 2 |
| Mold temperature | | [° C.] | 80 | 80 | 80 | 80 | 80 | 80 | 80 |
| Casting time | | [min] | >60 | >60 | >60 | 2 | >60 | 2 | >60 |
| Demolding time | | [min] | not possible | not possible | not possible | 20 | not possible | 20 | not possible |
| Initial exothermicity | from DSC | [° C.] and [W/g] | | | | 41.8 and −0.085 | | 43.5 and −0.069 | |
| Deblocking temperature | from DSC | [° C.] and [W/g] | | | | 79.3 and −0.028 | | 67.4 and −0.033 | |
| Final blocking temperature | from DSC | [° C.] and [W/g] | | | | none | | none | |
| Final temperature | from DSC | [° C.] and [W/g] | | | | 132.2 and −0.085 | | 94.7 and −0.069 | |

*inventive example

Remarks Concerning the Results in the Tables:
7: Too much catalyst 1 destroys the mechanical properties of the product. Compression set in example 7 is 54% and is thus too high (in example 1 only 31% and in example 4 only 32%). Hardness at 80° C. in example 7 is 50 Shore A, rather than 55 Shore A in example 1 and 54 Shore A in example 4. The amount of catalyst (c) in example 7 is 500 ppm, based on component b1). The casting time of 1 minute is quite short, and too short for many cast elastomer applications.
8: With too little catalyst 1, the cast elastomer is no longer demoldable. The amount of catalyst (c), based on component b1) corresponds to 12.5 ppm. The batch was discarded.
9 and 10: Without a water scavenger, it was not possible to produce demoldable cast elastomers. Moreover, the mixture of component b1) and catalyst used was not storage-stable. High amounts of catalyst (see example 10 with 700 ppm of catalyst 1 compared to example 1 with 200 ppm) did not lead to a better result. The batches had to be discarded.
12 and 14: With the catalysts used, it was not possible to demold the elastomers formed. The batches were discarded.
11 and 13: The elastomers exhibited streaks and were inhomogeneous. Hardness varied significantly within the elastomer. The casting time was much shorter than the casting time of the inventive elastomers. Longer casting times were not achievable with a smaller amount of catalyst (see examples 12 and 14). The batches were discarded.

The results from table 2 and example 7 in table 1 show it is not possible in any case with the catalyst combinations used in these comparative examples to produce polyurethanes with good mechanical properties. Only with the inventive catalysts is it possible to produce elastomers with good properties (examples 1 to 3 in table 1). Comparative examples 4 to 6 (with a heavy metal problem relating to a mercury catalyst) have excessively long demolding times, and the mold temperature in some cases is higher than for the inventive elastomers. Thus, it is possible with the inventive elastomers not just to dispense with mercury but also to produce more economically, since short demolding times enable faster production cycles.

The invention claimed is:
1. A polyisocyanate polyaddition product with good mechanical properties obtained by reacting
   a) a polyisocyanate and
   b) a NCO-reactive compound selected from the group consisting of b1) long-chain polyester polyols with an OH number of from 27 to 112 mg KOH/g and a functionality of from 1.9 to 2.3, b2) short-chain hydroxyl compounds with an OH number of from 300 to 1810 mg KOH/g and a functionality of from 1.9 to 2.3, and mixtures thereof,
   in the presence of components consisting of
   c) a latent catalyst
   d) optionally a tin catalyst,
   e) optionally a filler and/or fiber material,
   f) optionally an assistant and/or an additive,
   g) optionally a blowing agent, and
   h) at least one water scavenger,
   wherein the latent catalyst c) consists of a monocarboxylic acid-blocked amidine in an amount of from 20 to 400 ppm, based on component b1), wherein the molar ratio of amidine to carboxylic acid is between 1:3 and 1:0.5,
   wherein the casting time of the polyisocyanate polyaddition product is from 2 to 10 minutes and the hardness is from 60 to 96 Shore A.
2. The polyisocyanate polyaddition product of claim 1, wherein the polyisocyanate a) is a NCO prepolymer formed from diphenylmethane diisocyanate (MDI) and/or carbodiimidized/uretoniminized diphenylmethane diisocyanate and/or allophanatized MDI.
3. The polyisocyanate polyaddition product of claim 1, wherein the polyisocyanate a) is a NCO prepolymer based on polyester polyol.
4. A process for preparing the polyisocyanate polyaddition product comprising reacting
   a) a polyisocyanate with
   b) a NCO-reactive compound selected from the group consisting of b1) long-chain polyester polyols with an OH number of from 27 to 112 mg KOH/g and a functionality of from 1.9 to 2.3, b2) short-chain hydroxyl compounds with an OH number of from 300 to 1810 mg KOH/g and a functionality of from 1.9 to 2.3, and mixtures thereof, in the presence of components consisting of
c) a latent catalyst
d) optionally a tin catalyst,
e) optionally a filler and/or fiber material,
f) optionally an assistant and/or an additive,
g) optionally a blowing agent, and
h) at least one water scavenger,
wherein the latent catalyst c) comprises a monocarboxylic acid-blocked amidine in an amount of from 20 to 400 ppm, based on component b1), wherein the molar ratio of amidine to carboxylic acid is between 1:3 and 1:0.5.

5. The process of claim 4, wherein the latent catalyst c) is added via the NCO-reactive compound b) and the catalyst d) is added separately.

6. The process of claim 4, wherein the latent catalyst c) and the catalyst d) are added via the NCO-reactive compound b).

7. The process of claim 4, wherein the latent catalyst c) and a portion of the amount of the catalyst d) are added via the NCO-reactive compound b) and the rest of the amount of the catalyst d) is added separately.

8. An article comprising the polyisocyanate polyaddition product of claim 1, wherein the article is a screen, a pipeline pig, a roll, a wheel, a roller, a stripper, a plate, a cyclone, a conveyor belt, a coating bar, a coupling, a seal, a buoy or a pump.

\* \* \* \* \*